3,005,793
ANTI-STATIC COMPOSITION COMPRISING MONO-
OLEFIN POLYMER AND A BETAINE COM-
POUND, AND METHOD OF USING SAME
Cary R. Wagner, Utica, Ohio, assignor to Phillips Petroleum Company, a corporation of Delaware
No Drawing. Filed Dec. 11, 1957, Ser. No. 701,959
12 Claims. (Cl. 260—31.2)

This invention relates to a polymer composition which has been modified to lessen its tendency to develop static charges of electricity. In another aspect this invention relates to a method of reducing the tendency of a polymeric article to become charged with static electricity. In one of its more specific aspects this invention relates to structures of thermoplastic olefinic polymer which have been treated to lessen their tendency to develop and hold static charges.

Polymers of olefins such as polyethylene, polypropylene and copolymers of ethylene with other monoolefins, when formed into films, sheets, filaments, or the like, have a tendency to develop and retain electrostatic charges. As a result of this characteristic, such articles attract dust and lint. This characteristic is particularly troublesome in the fabrication of sheets, films or textiles woven from polymer fibers as these static charges tend to cause the films to cling together or to the guides or rolls of the machinery. It is, therefore, highly desirable to reduce the tendency of such materials to form static charges both before and after fabrication.

I have found that polymers of olefins can be modified to lessen their tendency to develop static charges of electricity by treating the polymer composition or the surface of the finished article with a compound having the formula

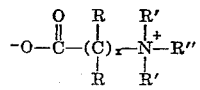

wherein $x$ is an integer of from 1 to 3, inclusive; each R is preferably hydrogen but can also be an alkyl radical having from 1 to 5 carbon atoms, inclusive; each R' is an alkyl radical having from 1 to 5 carbon atoms, inclusive; and R'' is an alkyl radical having from 10 to 20 carbon atoms, inclusive. The alkyl radicals designated by R or R' can be alike or different. I have found that this material, when incorporated into the polymer composition in small amounts, substantially reduces the capacity of the polymer to build up a static charge and also enables the polymer to dissipate the static charge much more rapidly than an untreated polymer of the same type.

It is an object of my invention to provide a polymer composition which can be fabricated into such structures as films, sheets, filaments, and the like, with less tendency to develop static charges both during and after fabrication.

It is another object of my invention to provide finished polymeric structures which have a lessened tendency to develop static charges and which will dissipate such charges more rapidly.

It is a still further object to provide a method of treating olefinic polymers to reduce their tendency for developing and holding electrostatic charges.

Other objects, advantages and features of my invention will become apparent to those skilled in the art from the following description and the claims.

The compositions which I improve by my invention are thermoplastic, solid or semisolid olefin polymers. By olefin polymers as used in this specification and in the claims I mean both homopolymers and copolymers of monoolefins containing from 2 to 8 carbon atoms, inclusive, for example polymers of 1-hexene and 1-octene and, in particular, the homopolymers of mono-1-olefins having from 2 to 4 carbon atoms, inclusive, such as polyethylene, polypropylene and polybutene as well as copolymers of ethylene with at least one of the monoolefins having 2 to 4 carbon atoms, inclusive, such as propylene, 1-butene and 2-butene.

Methods of preparing olefin polymers by processes employing extremely high pressures are well-known in the art. Polyethylene, for example, can be prepared by known processes employing pressures of 500 to 3,000 atmospheres and above with temperatures in the range of 100 to 400° C. A small amount of oxygen, for example, 0.01 percent to 0.1 percent, can be used to promote the polymerization. The methods which I prefer to form the polyolefins for my invention are low pressure catalytic processes such as are disclosed in the copending United States patent applications of J. P. Hogan and R. L. Banks, Serial No. 573,877, filed March 26, 1956, now U.S. 2,825,721; and of H. D. Lyons and G. Nowlin, Serial No. 495,045, filed March 17, 1955. In the process disclosed by the first of the applications referred to above, aliphatic monoolefins having up to 8 carbon atoms per molecule and no branching nearer the double bond than the four-position are polymerized in the presence of a catalyst comprising, as an essential ingredient, chromium oxide, preferably including a substantial amount of hexavalent chromium (for example, at least about 0.1 percent by weight of the total catalyst). The chromium oxide is ordinarily associated with at least one other oxide, particularly at least one porous oxide selected from the group consisting of silica, alumina, zirconia and thoria. The total chromium content of the catalyst in its preferred form is between 0.1 and 10 weight percent although higher chromium contents are at times advantageous.

This polymerization is preferably conducted with the olefin in admixture with a hydrocarbon which is inert and can be maintained in a liquid phase under the polymerization condition. Suitable hydrocarbons are paraffins or cycloparaffins, for example, normal heptane, 2,2,4-trimethylpentane, cyclohexane, methylcyclohexane, isohexane, normal pentane, isopentane and the like. The temperature for the polymerization reaction is usually in the range of about 100 to 500° F. with a temperature in the range of 150 to 375° F. being preferred for the polymerization of ethylene. A continuous slurry-type reaction technique is generally used with the catalyst being in powdered form, for example, from 40 to 100 mesh, and suspended in the hydrocarbon diluent. A pressure sufficient to maintain the diluent in the liquid phase is employed, for example, from about 200 to 700 pounds per square inch absolute, although higher pressures can be used. The polymerization can also be conducted in the gas phase. When polymerizing with a suspended catalyst in the liquid phase the preferred temperature is about 200 to 325° F.

While the above-described low pressure process is most highly preferred for preparing the olefin polymers for my invention, other processes can be used such as those employing catalyst systems disclosed in the above-mentioned copending application of Lyons and Nowlin.

Ethylene can be converted rapidly to high molecular weight polyethylene even at low pressures and temperatures in the presence of catalyst systems having two or more components, one component being an organometal derivative, a metal hydride, or a group I, II or III metal and the other component being a compound of a group IV to VI metal. With certain of the above two-component systems an organic halide having 30 or less carbon atoms per molecule or a metal halide can be used advantageously as a third catalyst component. Salts of titanium, zirconium, thorium, uranium and chromium are especially suitable. The polymerization is usually carried out in a reaction medium comprising an aliphatic or hydroaliphatic hydrocarbon such as pentane, hexane, cyclohexane, tetrahydronaphthalene, and the like.

Ethylene polymers prepared by the above-described low pressure catalytic processes can be characterized by their unusually high density of at least 0.94, generally above 0.955, gram per cubic centimeter at 25° C., and a crystallinity of at least 70 percent, preferably above 80 percent and more desirably above 90 percent, at 25° C. as determined by measurements of nuclear magnetic resonance (Wilson and Pake, Journal of Polymer Science, 10, 503 [1953]) using a sample of polymer which is in a state approaching equilibrium at 25° C.

The additives which are employed according to my invention to reduce the tendency of olefinic polymers to form static charges are known generally as betaines of esters which are internally ionized, that is, they contain both a positive and negative charge within the molecule, the term "betaine" used to indicate the inner salt structure of the molecule. Another term for these internal ions is "Zwitterion." The structure of the molecule can be illustrated as follows:

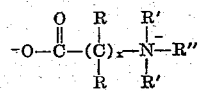

where $x$, R, R' and R" are as previously described.

These betaine compounds are employed in the polymer compositions in an amount ranging from about 0.025 to 3 weight percent based on the weight of the polymer. Higher concentrations can be used but are not economically justified by improved results over the range given. Preferably, the betaine compound is employed in amounts from 0.1 to 1 weight percent on the same basis.

The additives falling within the scope of the general formula given above can be incorporated into the olefinic polymers in a variety of ways. The materials can be dry blended together, or solutions of the polymer and the additive can be blended followed by coprecipitation of the two materials to form a homogeneous mixture. The additive can be compounded with the polymer by milling on roll mills or by mixing in a Banbury mixer. While it is preferred to incorporate the additive into the polymer, beneficial results can also be obtained by applying the additive to the surface of a polymeric article such as a sheet, film or filament. In this method a solution of the additive is applied to the surface of the shaped article and the solvent is evaporated. One of the solvents mentioned above for use in the polymerization of the polymer itself is suitable for such an application.

Examples of compounds which can be used in the practice of my invention and falling within the scope of the general formula given above are: betaine n-decyl ester N,N-dimethylglycine; betaine sec-dodecyl ester 3-(N,N-diethylamino)propionic acid; betaine tert-tetradecyl ester 4-(N,N-di-n-propylamino)butyric acid; betaine n-hexadecyl ester N,N-dimethylglycine; betaine n-octadecyl ester 3-(N,N-di-tert-butylamino)propionic acid; betaine n-eicosyl ester N,N-diisopropylgylcine; betaine n-undecyl ester 3-(N,N-di-n-pentylamino)propionic acid; betaine n-pentadecyl ester N-methyl-N-ethylglycine; betaine n-eicosyl ester 4-(N,N-di-n-pentylamino)-2,2,3,3,4 pentamethylvaleric acid; betaine n-decyl ester 3-(N,N-diethylamino)-2,2,3-trimethylbutric acid; betaine sec-tetradecyl ester 3-(N,N-dimethylamino)-2,2,3-tri-n-pentylcaprylic acid, and the like.

The polymer compositions can also contain other materials normally compounded with resins of this type such as antioxidants, fillers, pigments, and the like. While the compositions of my invention can be utilized with advantage in the fabrication of all polymeric articles regardless of shape, they are of particular advantage in the fabrication of films, sheets, slabs, tubes, pipes, fibers and fabrics.

Advantages of this invention are illustrated by the following example. The reactants, and their proportions, and other specific conditions are presented as being typical and should not be construed to limit the invention unduly.

*Example*

Polyethylene, prepared by a chromium oxide-catalyzed polymerization, was admixed with the betaine n-hexadecyl ester N,N-dimethylglycine and tested for static charge by the following procedure.

The chromium oxide catalyst employed in the polymerization contained 2.5 weight percent of chromium (as $CrO_3$) on a 90/10 silica-alumina base. This catalyst, having a particle size within the range of 40–200 mesh was activated at 1100° F. with dry air for 5 hours, employing a total time of 18 hours for the elevation of temperature from 100 to 1100° F. and cooling again to 150° F. Ethylene was polymerized in solution in cyclohexane at 285° F. and 500 pounds per square inch absolute using this catalyst. The polymer concentration (solution concentration) in the reactor was maintained at 8 percent by weight, and the residence time with the reactor was 2.5 hours. The polymer was recovered by water coagulation, after which it was melted and extruded in strand form. While in the molten state, 0.1 percent by weight (based on the polymer) of 1,5-di-tert-butyl-3-methylphenol was added to the polymer.

A sample of this polymer was admixed with 0.1 percent of the betaine n-hexadecyl ester N,N-dimethylglycine. A sample of this compounded polymer was then compression molded at 320° F. to form a slab 6" x 6" x 1/16" in dimension. A control sample of the polymer which contained none of the antistatic agent was also compression molded to a slab of the same size.

The sample and the control were rubbed with a piece of wool cloth to cause a static charge to build up on the polymer slabs. The presence of a static charge on the polymer samples was then determined by the use of a "Staticator" type 806 of W. E. Anderson, Inc. When using this apparatus, as the probe of the apparatus approaches the statically charged object, a scale reading is obtained if the charge object has a positive charge. If a reading is obtained as the probe is withdrawn from the charged object, the object has a negative charge. It was found that the polymer slab which contained 0.1 percent by weight of the betaine compound exhibited less capacity for building up a static charge than the polyethylene which contained none of this compound. The polymer sample which contained the betaine compound also dissipated the static charge much faster than the control. This clearly shows that the polymer composition containing the betaine compound is superior in antistatic properties to the polymer alone.

As will be evident to those skilled in the art, various modifications of this invention can be made, or followed, in the light of this foregoing disclosure and discussion, without departing from the spirit or scope thereof.

I claim:

1. A thermoplastic polymer composition which can be molded into shaped articles normally having a tendency to accumulate static charges thereon comprising a polymer selected from the group consisting of homopolymers of monoolefins having from 2 to 8 carbon atoms inclusive, and copolymers of said monoolefins with each other, and a compound having the formula

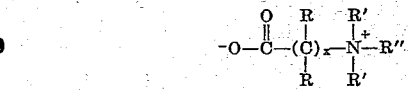

wherein $x$ is an integer of from 1 to 3 inclusive, each R is selected from the group consisting of hydrogen and alkyl radicals having from 1 to 5 carbon atoms inclusive, each R' is an alkyl radical having from 1 to 5 carbon atoms inclusive and R" is an alkyl radical having from 10 to 20 carbon atoms inclusive, said compound being present in an amount sufficient to lessen substantially said tendency to accumulate static charges.

2. A thermoplastic polymer composition which can be molded into shaped articles normally having a tendency to accumulate static charges thereon comprising a polymer selected from the group consisting of homopolymers of monoolefins having from 2 to 8 carbon atoms inclusive, and copolymers of said monoolefins with each other, and from 0.025 to 3 weight percent based on the weight of said polymer of a compound having the formula

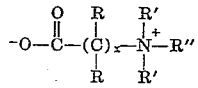

wherein $x$ is an integer of from 1 to 3 inclusive, each R is selected from the group consisting of hydrogen and alkyl radicals having from 1 to 5 carbon atoms inclusive, each R' is an alkyl radical having from 1 to 5 carbon atoms inclusive and R" is an alkyl radical having from 10 to 20 carbon atoms inclusive, said compound serving to lessen said tendency to accumulate static charges.

3. A thermoplastic polymer composition which can be molded into shaped articles normally having a tendency to accumulate static charges thereon comprising polyethylene, and from 0.025 to 3 weight percent based on the weight of said polyethylene of a compound having the formula

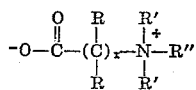

wherein $x$ is an integer of from 1 to 3 inclusive, each R is selected from the group consisting of hydrogen and alkyl radicals having from 1 to 5 carbon atoms inclusive, each R' is an alkyl radical having from 1 to 5 carbon atoms inclusive and R" is an alkyl radical having from 10 to 20 carbon atoms inclusive, said compound serving to lessen said tendency to accumulate static charges.

4. A thermoplastic polymer composition which can be molded into shaped articles normally having a tendency to accumulate static charges thereon comprising a polyethylene characterized by a density of at least 0.94 gram per cubic centimeter at 25° C. and a crystallinity of at least 80 percent at 25° C., and from 0.1 to 1 weight percent based on the weight of said polyethylene of betaine n-hexadecyl ester N,N-dimethyl glycine, said betaine compound serving to reduce said tendency to accumulate static charges.

5. As an article of manufacture a molded structure of monoolefin polymer having a substantially lessened tendency to accumulate static charges comprising a polymer selected from the group consisting of homopolymers of monoolefins having from 2 to 8 carbon atoms inclusive, and copolymers of said monoolefins with each other, and a compound having the formula

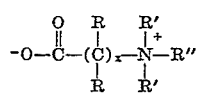

wherein $x$ is an integer of from 1 to 3 inclusive, each R is selected from the group consisting of hydrogen and alkyl radicals having from 1 to 5 carbon atoms inclusive, each R' is an alkyl radical having from 1 to 5 carbon atoms inclusive and R" is an alkyl radical having from 10 to 20 carbon atoms inclusive.

6. As an article of manufacture of molded structure of monoolefin polymer according to claim 5 wherein said polymer and said compound are in a homogeneous blend.

7. As an article of manufacture a molded structure of monoolefin polymer according to claim 5 wherein said compound is present only at the surface of said structure.

8. A method of reducing the tendency of a thermoplastic polymer composition to accumulate static charges of electricity when shaped into articles which comprises physically combining a monoolefin polymer selected from the group consisting of homopolymers of monoolefins containing 2 to 8 carbon atoms, inclusive, and copolymers of said monoolefins with each other with a compound having the formula

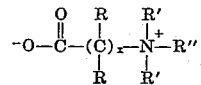

wherein $x$ is an integer of from 1 to 3 inclusive, each R is selected from the group consisting of hydrogen and alkyl radicals having from 1 to 5 carbon atoms inclusive, each R' is an alkyl radical having from 1 to 5 carbon atoms inclusive and R" is an alkyl radical having from 10 to 20 carbon atoms inclusive, said compound being present in an amount sufficient to lessen substantially said tendency to accumulate static charges.

9. A method of reducing the tendency of a thermoplastic polymer composition to accumulate static charges of electricity when molded into a shaped article, said polymer being selected from the group consisting of homopolymers of monoolefins having from 2 to 8 carbon atoms inclusive, and copolymers of said monoolefins with each other which comprises mixing into said polymer a compound having the formula

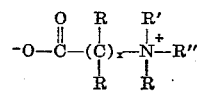

wherein $x$ is an integer of from 1 to 3 inclusive, each R is selected from the group consisting of hydrogen and alkyl radicals having from 1 to 5 carbon atoms inclusive, each R' is an alkyl radical having from 1 to 5 carbon atoms inclusive and R" is an alkyl radical having from 10 to 20 carbon atoms inclusive, said compound being present in an amount sufficient to lessen substantially said tendency to accumulate static charges.

10. A method of forming a polymeric molded structure which has a reduced tendency to accumulate static charges of electricity which comprises mixing with a polymer selected from the group consisting of homopolymers of monoolefins having from 2 to 8 carbon atoms inclusive, and copolymers of said monoolefins with each other, from 0.25 to 3 percent by weight based on the weight of the polymer of a compound having the formula

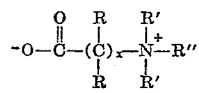

wherein $x$ is an integer of from 1 to 3 inclusive, each R is selected from the group consisting of hydrogen and alkyl radicals having from 1 to 5 carbon atoms inclusive, each R' is alkyl radical having from 1 to 5 carbon atoms inclusive and R" is an alkyl radical having from 10 to 20 carbon atoms inclusive, thereby forming a homogeneous blend, and molding said blend into said structure.

11. A method of treating a molded structure of monoolefin polymer to reduce substantially the tendency of said structure to accumulate static charges of electricity, said polymer being selected from the group consisting of homopolymers of monoolefins having from 2 to 8 carbon atoms inclusive, and copolymers of certain monoolefins with each other which comprises coating the surface of said structure with a solution of a compound having the formula

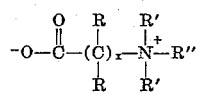

wherein $x$ is an integer of from 1 to 3, inclusive, each R is selected from the group consisting of hydrogen and alkyl radicals having from 1 to 5 carbon atoms inclusive, each R′ is an alkyl radical having from 1 to 5 carbon atoms inclusive and R″ is an alkyl radical having from 10 to 20 carbon atoms inclusive, in sufficient amount to lessen substantially the tendency of said structure to accumulate static charges.

12. A method of reducing the tendency of a polyethylene structure to accumulate static charges of electricity which comprises incorporating into said polyethylene prior to fabrication from 0.025 to 3 weight percent based on the weight of polyethylene of a compound having the formula

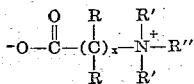

wherein $x$ is an integer of from 1 to 3 inclusive, each R is selected from the group consisting of hydrogen and alkyl radicals having from 1 to 5 carbon atoms inclusive, each R′ is an alkyl radical having from 1 to 5 carbon atoms inclusive and R″ is an alkyl radical having from 10 to 20 carbon atoms inclusive.

References Cited in the file of this patent

UNITED STATES PATENTS 2,135,641     Jacobson _____ Nov. 8, 1938